United States Patent [19]

Ladouceur et al.

[11] 3,927,465
[45] Dec. 23, 1975

[54] METHOD OF FORMING A NUT AND PANEL ASSEMBLY

[75] Inventors: Harold A. Ladouceur, Livonia; John H. Steward, Bloomfield Hills, both of Mich.

[73] Assignee: Multifastener Corporation, Detroit, Mich.

[22] Filed: Oct. 21, 1974

[21] Appl. No.: 516,317

Related U.S. Application Data

[60] Division of Ser. No. 397,559, Sept. 14, 1973, Pat. No. 3,878,599, which is a continuation-in-part of Ser. No. 63,316, Aug. 12, 1970, abandoned, which is a division of Ser. No. 841,037, July 11, 1969, abandoned.

[52] U.S. Cl. ............... 29/509; 29/522; 113/116 FF
[51] Int. Cl.² .................. B21D 39/00; B23P 11/00
[58] Field of Search ......... 29/509, 522, 432.2, 523; 151/41.73; 113/116 FF

[56] References Cited
UNITED STATES PATENTS

| | | | |
|---|---|---|---|
| 2,291,188 | 7/1942 | Lengel | 29/509 UX |
| 3,082,850 | 3/1963 | Weening | 29/509 UX |
| 3,234,987 | 2/1966 | Hentzi | 29/509 X |
| 3,253,631 | 5/1966 | Reusser | 151/41.73 |
| 3,282,315 | 11/1966 | Zahodiakin | 29/509 X |
| 3,282,317 | 11/1966 | Zahodiakin | 29/509 X |
| 3,299,500 | 1/1967 | Double | 151/41.73 X |
| 3,648,747 | 3/1972 | Steward | 151/41.73 |

*Primary Examiner*—Charlie T. Moon
*Attorney, Agent, or Firm*—Cullen, Settle, Sloman, & Cantor

[57] ABSTRACT

A method of securing a nut to a panel, including deforming the panel into a groove or recess in the nut by advancing a punch against the panel face opposed to the nut, deforming the panel edge beneath and against an inclined outer wall of the nut groove and further advancing the punch into a tool receiving recess in the bottom of the groove, beyond the panel edge. In one disclosed embodiment, the nut pieces its own hole in the panel. In the other embodiment, the panel is prepierced and the nut is clinched to the panel.

4 Claims, 16 Drawing Figures

METHOD OF FORMING A NUT AND PANEL ASSEMBLY

REFERENCE TO RELATED APPLICATIONS

This application is a divisional application of our copending application Ser. No. 397,559, filed Sept. 14, 1973, now U.S. Pat. No. 3,878,599, which application was a continuation-in-part application of our copending application for United States patent, Ser. No. 63,316, filed Aug. 12, 1970, now abandoned, which application was a divisional application of Ser. No. 841,037, filed July 11, 1969, now abandoned.

BACKGROUND OF THE INVENTION

The present invention is especially directed to pierce and clinch nuts of the type designed to provide for a flush installation in a panel; i.e., where the installed nut projects from only one surface of the panel. Nuts and installations of this general type are disclosed in U.S. Pat. Nos. 3,299,500; 3,314,138 and 3,315,345. These patents in general disclose piece type nuts for flush mounted installations in which the nut is either formed with an undercut groove or in which metal from the nut is staked and folded over in the panel metal. In the prior art arrangements in which an undercut groove is employed, as in U.S. Pat. No. 3,315,345, the forcing of the panel metal into the undercut portions of the grooves is accomplished by deforming the panel metal under pressure sufficient to cause the metal to flow. Because of the fact that the sheet metal with which nuts of this type are employed has a permissable variation in thickness, the retention characteristics of such an arrangement can vary considerably with variations in panel thickness because of variations in the volume of metal displaced in the following of the metal. Where primary reliance for retention is placed on a staking of a portion of the pilot into overlying relationship with metal in the groove, the retention is dependent upon the amount of metal staked from the pilot, and this arrangement frequently requires an undesirable compromise between achieving adequate retention while at the same time avoiding distortion of the nut threads.

The present invention is designed to avoid the foregoing problems in that panel metal is forced into an undercut wall of the groove by force applied solely in a direction away from the thread cylinder during the piercing or clinching operation to achieve position retention without having to rely on flowing of the metal and without thread distortion.

In the present invention, the outer wall of the groove—i.e., the wall most remote from the nut threads—diverges from the nut axis in its inward extend to provide the undercut retaining surface of the groove. In the pierce nut embodiment, the inner wall of the groove is parallel to the nut axis. The inner half of the bottom of the groove is deeper than the outer portion of the bottom of the groove to provide a recess which receives the tip of the piercing or clinching tool so that the end of the tool can project inwardly into the groove beyond a flat panel metal abutment wall which forms the outer portion of the groove bottom. The tip of the tool has a bevel or chamfer on its outer surface, and the thickness of the tool is less than the width of the groove.

When the nut is used as a piercing tool, the inner side of the punch travels down the inner wall of the groove to shear the panel, while the bevelled or chamfered outer surface acts as a wedge forcing the sheared panel edge outwardly into engagement with the undercut inclined outer wall of the groove. Because the tip of the tool can pass inwardly into the groove beyond the abutment wall bottom portion, the panel metal is positively forced by the wedging action into the undercut region of the groove. The depth of the wall portion of the bottom is somewhat less than the width of the groove, hence the panel metal, which is depressed into the groove, in some instances, may be compressed against the abutment wall portion or, more commonly, is folded upon itself to extend beneath the bevelled outer surface. When the panel is pre-pierced, the pilot may be eliminated, permitting a larger diameter threaded bore in the nut. The groove or channel surrounds the bore to define a counter-bore having an inclined outer wall and a greater depth adjacent the bore than at the outer wall, as described above.

The method of this invention then includes: positioning the nut against one face of the panel; engaging the opposed panel face with a tool configured to be received within the recess at the bottom of the groove; deforming the panel edge into the groove opening and against the groove outer side wall; and, continuing to advance the tool into the groove recess, beyond the panel edge, to securely retain the nut on the panel.

Other objects and features of the invention will become apparent by reference to the following specification and to the drawings.

IN THE DRAWINGS

DESCRIPTION OF THE PREFERRED EMBODIMENTS AND METHOD OF THIS INVENTION

Figure 1:
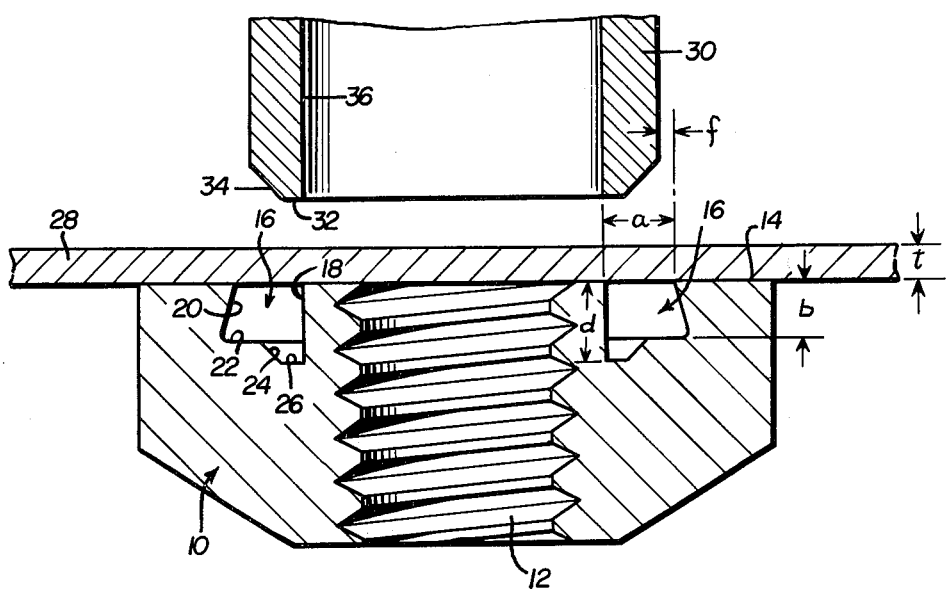
FIG. 1 is a cross-sectional view of one form of nut which may be utilized in the method of this invention, showing the nut positioned beneath a panel with the piercing tool about to begin its downward stroke.
Figure 2:
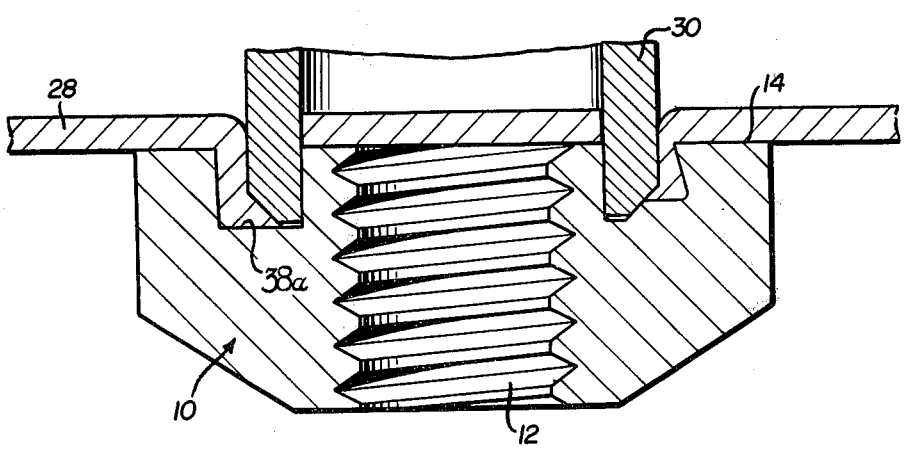
FIG. 2 is a view similar to FIG. 1, showing the nut and piercing tool at the conclusion of the piercing stroke.

Referring first to FIGS. 1 and 2, there is shown in cross-section a nut body designated gradually 10 having a centrally located tapped bore 12. The upper or panel engaging end surface 14 of the nut is flat and is grooved as generally indicated at 16 on opposite sides of the tapped bore 12.

Figure 3:
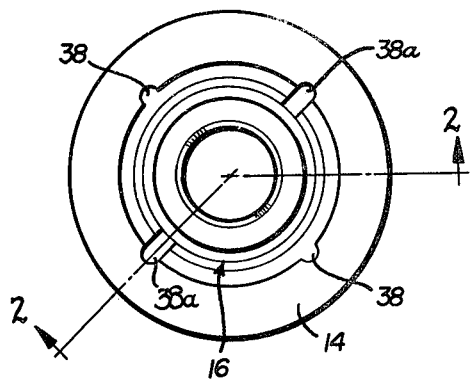
FIG. 3 is an end elevational view of one form of nut employing the grooved configuration of FIGS. 1 and 2.
Figure 4:
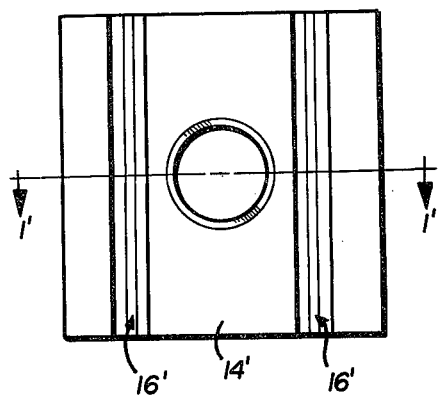
FIG. 4 is an end elevation view of a nut of square configuration which may be utilized in the method of this invention.

Referring briefly to FIGS. 3 and 4, the nut shown in FIGS. 1 and 2 will be assumed to be the circular nut of FIG. 3, with FIGS. 1 and 2 being taken approximately at the section line indicated at 1—1. However, it is believed apparent that the cross-sectional view of FIG. 1 might equally well have been taken on the section line 1'–1' of FIG. 4, the reference numerals 14' and 16' of FIG. 4 representing the flat end surface 14 and the grooves 16 of FIG. 1.

Returning to FIGS. 1 and 2, the groove 16 is defined by an inner wall 18 which extends parallel to the axis of bore 12 and an outer wall 20 which diverges from inner wall 18 in its extent inwardly from end surface 14. At the bottom of outer wall 20, a flat abutment surface 22, parallel to end surface 14 of the nut body, extends across approximately one-half of the width of groove 16 to a bevel surface 24 inclined inwardly toward the nut axis at an angle of approximately 45° to terminate at a flat bottom surface 26. The surfaces 24 and 26, and the lower portion of inner wall 18 cooperatively define a recess at the bottom of groove 16 which extends inwardly of the nut body to a depth greater than that of the abutment surface 22.

In FIG. 1, the nut is supported from beneath by an anvil, not shown, and a sheet metal panel 28 is supported upon the nut in face-to-face engagement with end surface 14, again by suitable means, not shown. Spaced above panel 28 is shown the lower end of a tubular piercing tool 30 whose tip is defined by an annular flate surface 32 at the inner side of the tool and a bevelled surface 34, inclined outwardly at a 45° angle. Tool 30 is of hollow, annular construction having an inner wall surface 36 of a diameter, in the circular nut configuration of FIG. 3, slightly greater than the diameter of the inner groove wall 18. The width of the flat annular bottom surface 32 of the tool is slightly smaller than the width of the flat bottom wall 26 defining the bottom of the recess in the grooves so that the tool can be driven into the groove until surface 32 of the tool contacts surface 26 of the nut.

Referring now to FIG. 2, the tool is shown at the conclusion of its piercing stroke, with the lower end of the tool being received in the recess defined by walls 24 and 26 of the groove. The panel metal has been mechanically forced outwardly into engagement with the inclined surface 20 of the groove and has been compressed or deformed somewhat in that the volume of the groove left after the insertion of the tool is somewhat less than the actual volume of the panel metal forced into the groove.

Referring now to FIGS. 5–10, there are shown in these figures the progressive steps in the piercing and interlocking of the panel to the nut.

Figure 5:
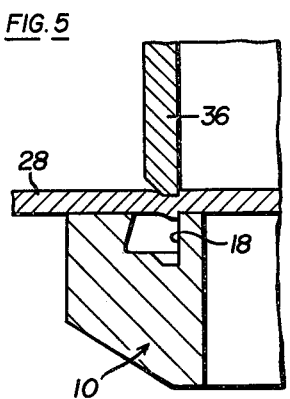
FIGS. 5, 6, 7, 8, 9 and 10 are partial cross-sectional views showing successive steps in the piercing and interlocking method of this invention.

In FIG. 5, the tip of tool 36 has just entered the panel surface, and shearing of the panel has commenced at the inner or right-hand edge of the tool tip and also at the shoulder at the upper end of inner wall 18 of the groove. At this particular stage, the only displacement of panel metal which has occurred is in the region immediately below the tool tip.

Figure 6:
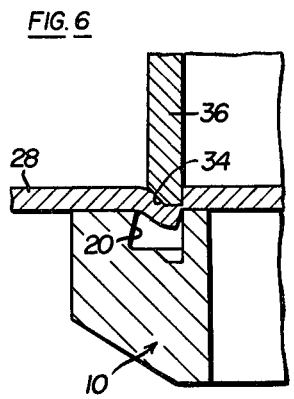

In FIG. 6, the tool tip has advanced nearly completely through the panel, and the bevelled surface 34 of the tool is substantially completely in face-to-face engagement with the upper surface of the panel. The panel has been bent downwardly about the shoulder formed at the upper end of the outer wall 20 of the groove, but the panel has still retained its original thickness at all points because the closest point on the surface of the tool to the shoulder at the upper end of outer wall 20 still exceeds the thickness of the panel.

Figure 7:
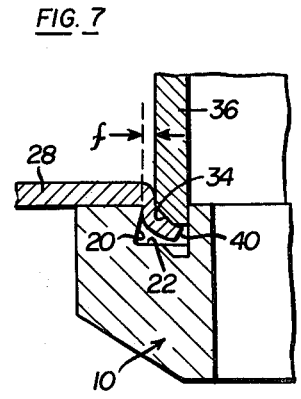

In FIG. 7, the tool has been advanced into the groove to a point at which the bevelled surface 34 is now entirely within the groove. It will be noted that the difference $f$ between the thickness of the tool 36 and the width of the groove at its opening is less than the thickness of the metal of panel 28 and that the thickness of the panel has thus been reduced between the shoulder at the upper edge of outer wall 20 and the outer surface of tool 36. The downward movement of the tool relative to the stationary nut and panel as viewed in FIG. 7 thus forceably displaces some of the panel metal during movement of the tool between the FIG. 6 and FIG. 7 positions, and the metal which is displaced by the bevelled surface 34. Thus, the force tending to displace the metal acts, in general, in a direction normal to the bevelled surface 34 of the tool so tht the displaced metal is not only moved downwardly, as viewed in FIG. 7, into the groove, but at the same time is forced outwardly toward the outer grooved wall 20.

It will further be noted from FIG. 7 that because of the downward component of metal displacement, the upper surface of panel 28 is, in effect, stretched and drawn downwardly into the groove, resulting in a smoothly flared curved surface on the panel adjacent the outer wall of the tool.

It will further be noted from FIG. 7 that the sheared edge 40 of the panel is now in a position where it becomes apparent that further downward movement of the tool 36 will force the lower surface of the panel into engagement with abutment surface 22.

Figure 8:
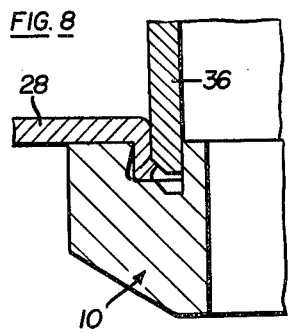

In FIG. 8, the tool 36 has advanced inwardly of the groove from its FIG. 7 position, and the lower surface of the panel has engaged abutment surface and is being forced outwardly across surface 22. In effect, a reverse bend has now been created in the panel metal tending to force metal in toward the corner at the intersection of abutment surface 22 and the outer wall 20 of the groove.

Figure 9:
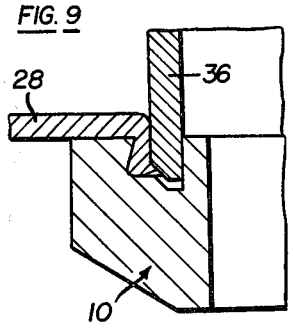

In FIG. 9, the tool has reached almost the end of its stroke, and the undercut outer wall of the groove has been substantially filled with the panel metal.

Figure 10:
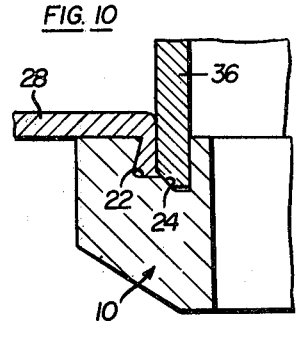
Figure 14:
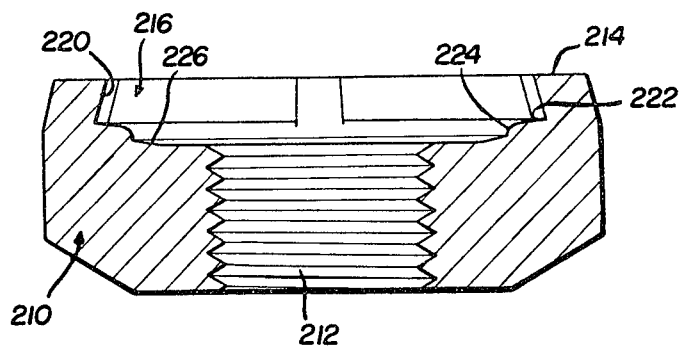
FIG. 14 is a cross-sectional view of the nut embodiment shown in FIG. 13, in the direction of view arrows 14—14.

In FIG. 10, the tool has reached the end of its stroke.

The progressive steps illustrated in FIGS. 5–10 show the idealized situation in which, as shown in FIG. 10, the inner surface of the panel metal in the completed assembly forms a cylindrical surface which projects upwardly from precisely the juncture between abutment surface 22 and the inclined wall 24 of the tool receiving recess. In the case where the panel metal is slightly thicker than that illustrated in FIGS. 5–10, when the stage shown in FIG. 9 is reached, some metal will be left over and will extend downwardly along the inclined wall 24 of the tool receiving recess in the completed nut. In the event that the panel metal is slightly thinner than illustrated in FIGS. 5–10, the panel metal in the completed assembly may have a configuration more like that of FIG. 9, or even of FIG. 8. It will be noted, however, that the bevelled surface 34 on the tool, positively assures that the panel metal will be forced or wedged radially outwardly into engagement with the undercut outer wall 20, regardless of whether the amount of metal in the groove is increased or decreased relative to the amount illustrated in FIGS. 5–10.

In order to accomplish this, the relative dimensions of the groove, panel and tool should be maintained within certain limits. In FIG. 1, the various dimensions have been indicated as follows:

| | |
|---|---|
| Width of groove at end surface 14 | a |
| Groove depth from end surface 14 to abutment wall 22 | b |
| Depth of groove from end surface 14 to bottom of recess at wall 26 | d |
| Panel thickness | t |
| Difference between radius of outer surface of tool 30 and outer wall 20 of groove at surface 14 | f |

The relationship between these various dimensions should be approximately as follows:

The width of groove a should be greater than depth b by about 10–20%
The depth d of the groove should exceed the groove width a
The radial difference f between the outer surface of the tool and the outer edge of groove should be approximately one-half of the maximum panel thickness t.

Because of variations in the panel thickness $t$, the relationship involving the panel thickness can permissably vary from those specified above. Sheet metal, as supplied to the automotive industry for example, cannot be supplied in precise uniformity of thickness, mainly for economic reasons. The ranges specified above will be normally satisfactory for panel metal of a given nominal thickness. A slight expansion of the range of panel thicknesses which may be handled for a nut of given groove dimensions can be achieved by using tools of differing wall thickness so that the dimensions $f$ is regulated to remain at approximately one-half the panel thickness. If the dimension $f$ becomes much less than half the panel thickness, the panel metal as it is wrapped around the upper edge of wall 20, becomes too thin, and thus is easily sheared. If the dimension $f$ becomes much greater than half the panel thickness, the panel metal is not forced quite as firmly against wall 20, and a loss of retention or holding strength is the result.

The angle of inclination of wall 20 to the nut axis is preferably somewhere in the neighborhood of 15 percent. At an angle of 10°, a noticeable reduction in retention occurs, while at an angle of greater than 20°, difficulties are encountered in forcing the metal back into the undercut, thus resulting in a reduction of holding strength.

In the round nut configuration of FIG. 3, torque resistance is achieved by providing a series of notches, such as 38, in the outer wall of groove 16. The bottom of the notches may be located at the level of abutment surface 22 or, if increased torque resistance is desired, the notches may extend inwardly to the level of the recess bottom 26 as shown at 38a. Panel metal is forced into the notches 38 during the piercing operation.

The above description applies in general to the square nut embodiment of FIG. 4 in which two grooves 16' extend in parallel relationship on opposite sides of the tapped bore, the grooves being of the same cross-sectional configuration as those shown in FIGS. 1 and 2. In the case of the FIG. 4 embodiment, the tool will consist of two parallel members. The nut of FIG. 4 possesses some advantages over that of FIG. 3 in that it can be formed from rolled strip stock, but has the disadvantage of requiring orientation in some installations. The undercut in the nut of FIG. 3 is constructed by a blank with the walls 18 and 20 of the groove initially in parallel relationship to each other with surface 14 lying on a conical surface and subsequently cold forming the nut to, in effect, bend the wall 18 into the conical relationship shown in FIGS. 1 and 2.

The retention characteristics of the annular groove embodiment of FIGS. 1 and 2 are far superior to those of the square nut of FIG. 4 insofar as resistance to forces tending to move the nut away from the panel are concerned. This is because in the case of the nut of FIGS. 1 and 2, a continuous annular band of panel metal underlies the overcut groove and the nut cannot be separated from the panel without compressing this annular band of metal around its entire circumference. In the square nut embodiment of FIG. 4, separation of the nut from the panel is opposed solely by the resistance of the panel metal to bending along the shoulder at the upper end of the inclined outer wall of the groove.

Figure 12:
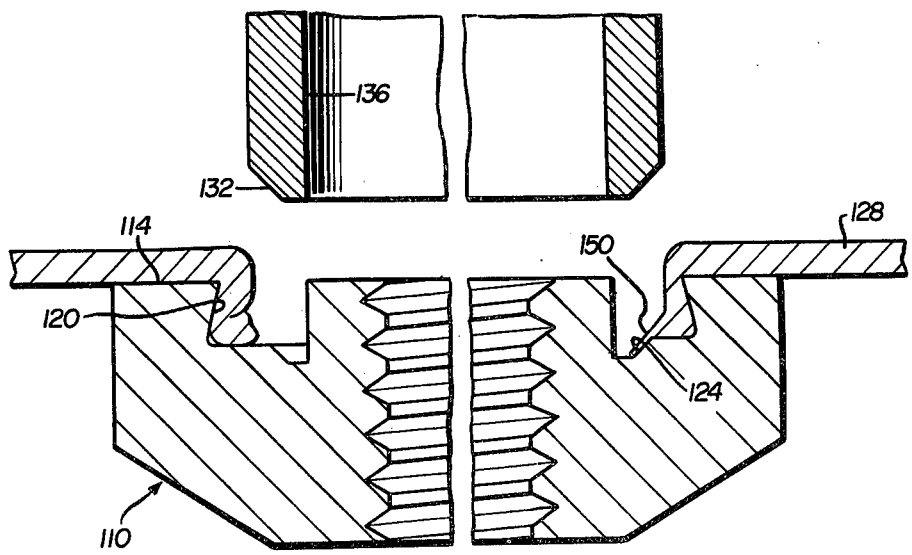
FIG. 12 is a cross-sectional view taken on the line 12—12 of FIG. 11 showing the nut of FIG. 11 installed in a panel.
Figure 11:
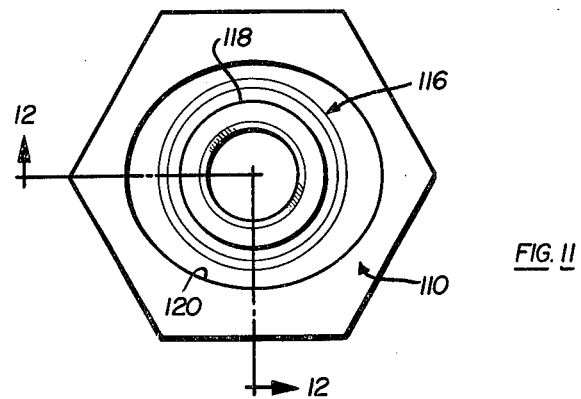
FIG. 11 is an end elevational view of another nut embodiment used in the method of the invention.

In FIGS. 11 and 12, there is shown another embodiment of the invention in which an annular groove 116 (FIG. 11) is formed in one face of a nut body, designated generally 110, by retaining the cylindrical surface configuration of the inner wall 118 while forming the outer wall 120 in an oval or generally elliptical configuration. For purposes of illustration, the out-of-roundness of the elliptical outer wall 120 has been greatly exaggerated in FIG. 11 — in one example of a nut of the FIG. 11 type, the major diameter of the ellipse is 0.593 inch with a minor diameter of 0.562 inch. The nut of FIGS. 11 and 12 retains the advantage of not requiring orientation for installation, because the nut is installed in the panel by the use of a circular tool identical to that employed in installing the nut of FIGS. 1 and 2.

Because of the fact that the width of the groove 116 in the FIGS. 11 and 12 embodiment is not uniform, it is apparent that the general relationships of relative dimensions previously set forth is only approximated in the FIG. 11 embodiment. However, the groove, tool and panel thickness dimensions of the FIG. 11 embodiment are selected in terms of the average groove width.

A cross-sectional view of a nut of the FIGS. 11 and 12 embodiment installed in a panel 128 appears in FIG. 12, the left-hand portion of FIG. 12 showing a cross-section at a position of maximum groove width, while the right-hand portion of the figure shows the cross-section at a location of minimum groove width. Because a circular tool is employed, to eliminate the necessity of orienting the nut, the panel metal configuration in the position differs as between the minimum and the maximum groove width sections. The effect, as illustrated in FIG. 12, is similar to the effect produced by a relative increase or decrease in panel thickness previously described in connection with the progressive steps of the installation of a nut of the FIGS. 1 and 2 embodiment. As best seen in the right-hand portion of FIG. 1, where the volume of panel metal within the groove is relatively large as compared to the groove dimensions, a portion of the panel metal 150 extends down the inclined wall 124 of the tool receiving recess. At the left-hand portion of FIG. 12, where the volume of the groove is relatively large as compared to the amount of panel metal forced into the groove, the end result is a panel metal configuration which falls somewhat short of optimum filling of the undercut of the groove, however, it will be noted that even where underfilling is present, the major portion of the undercut groove wall 120 is engaged by the panel metal.

The embodiment of the nut 210 shown in FIGS. 13 to 16 differs from the nut embodiments described above in that the nut is clinched to a pre-pierced panel, rather than utilized as a piercing tool. The central piercing pilot portion surrounding the nut bore has been eliminated in the embodiment shown in FIGS. 13 to 16, permitting enlargement of the tapped bore 212. This configuration has an advantage in certain applications, particularly where the bore diameter is important, such as a bung or plug application for containers and the like. Enlarging the bore diameter in the nut embodiment shown in FIG. 1, for example, would weaken the wall, requiring a large diameter nut, which may not be possible in certain applications.

The clinch nut embodiment shown in FIGS. 13 to 16 includes a flat panel engaging face 214 and a groove or channel 216 surrounding the nut bore and defining a counter-bore. The configuration of the groove or channel may be similar to the groove 16 in FIG. 1 described above, except that the inner wall 18 has been eliminated with the piercing pilot. The groove shown in FIG. 14 includes an inclined outer wall 220, an abutment wall 222 generally parallel to the end face 214 of the nut, an arcuately inclined surface 224 and a bottom wall 226. In the clinching operation, the inclined or bevelled surface 224 and the bottom wall 226 define a tool receiving recess, as described above.

Figure 13:
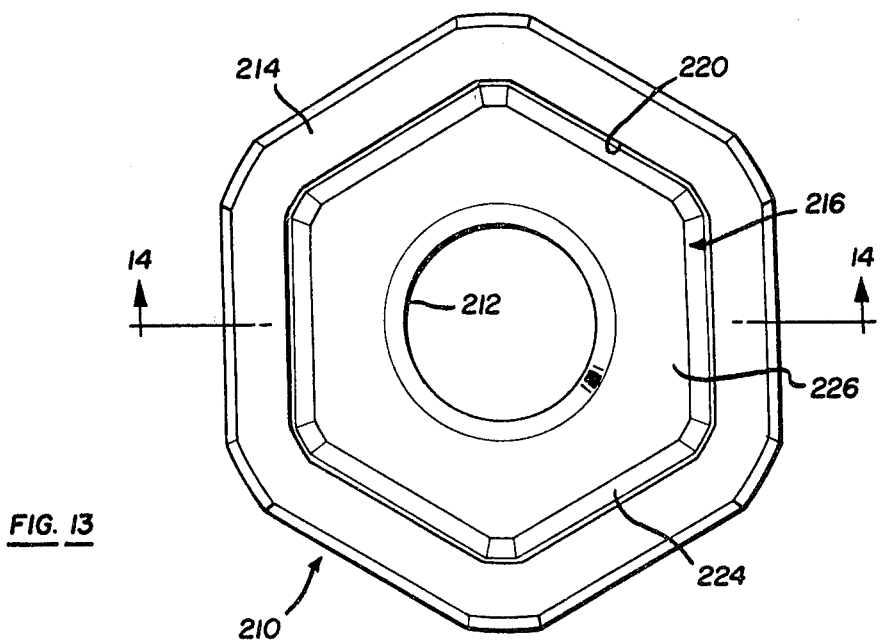
FIG. 13 is a top elevation of another nut embodiment which may be utilized in the method of this invention.

It will be further noted from FIG. 13 that this embodiment of the nut is generally hexagonal, however the corners are truncated. It has been found that this configuration is particularly suitable for pierce and clinch nuts of the type disclosed. The hexagonal channel or groove prevents rotation of the nut on the panel after securement and is easily formed in a die or cold header apparatus. The corners have been truncated to prevent tearing of the panel and to reinforce the nut body.

Figure 15:
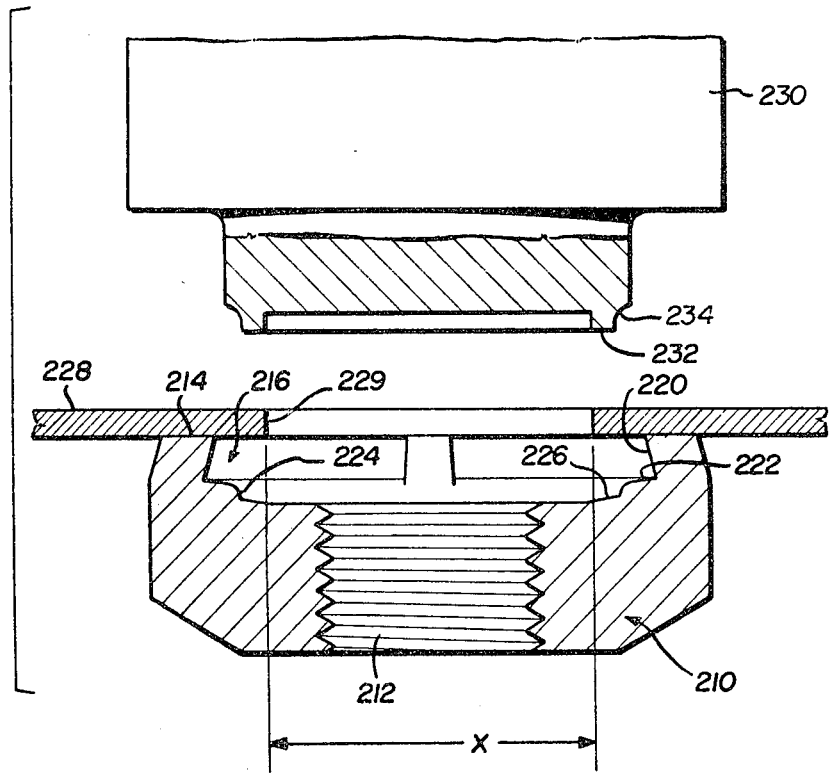
FIG. 15 illustrates the nut embodiment shown in FIGS. 13 and 14 received against a panel, prior to clinching.
Figure 16:
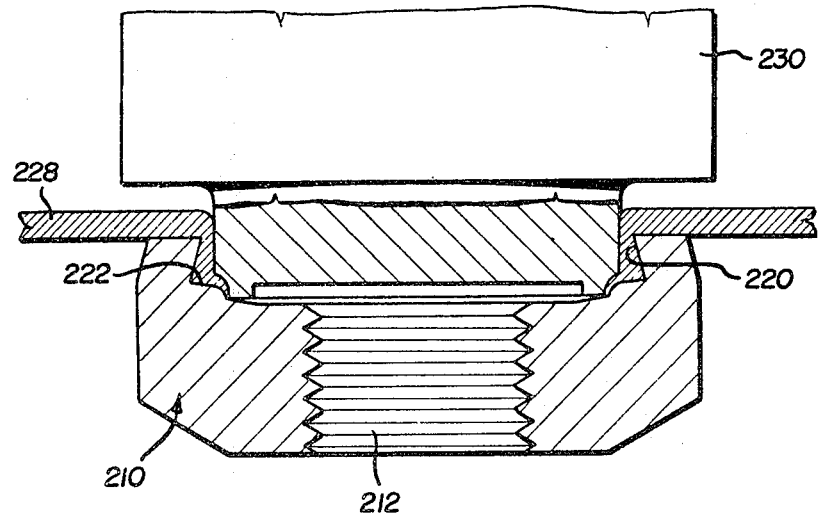
FIG. 16 illustrates the clinching operation utilizing the nut, panel and tool illustrated in FIG. 15.

The clinching method of this invention is shown in FIGS. 15 and 16. The nut is received against one face of the panel 228 with the channel 216 opening toward the panel face. The panel, in the clinching operation, includes a hole 229 which has been previously formed, as by punching. The configuration of the panel opening will depend upon the particular application, however in the disclosed embodiment a circular opening is preferred. The diameter of the panel opening has been chosen such that the panel edge may be extruded into the groove or channel 216, as shown in FIG. 16, against the abutment wall 222, but not against the bottom wall 226 of the groove which receives the tool edge 232. Stated another way, the diameter of the panel opening should be equal to approximately the hole diameter pierced by the pierce nuts described hereinabove. The diameter of the opening "x" shown in FIG. 15 is equal to the inside diameter of the bottom wall 226 of the groove. It will be noted that the wall 226 is inclined at approximately a 10° angle to permit parting of the nut in the cold header operation.

In the clinching method, the nut bore 212 is aligned in registry with the panel opening and the nut is normally supported on an anvil or the like, not shown. The tool or punch 230 is located above the nut groove, coaxially aligned with the nut bore and the punch opening. The panel and punch may then be moved toward the punch, or vice-versa. The punch in the disclosed embodiment includes an annular projection 232 which is configured to be received in the tool receiving recess, as shown in FIG. 16. Except for the piercing operation which has been eliminated in the clinching operation shown in FIGS. 15 and 16, the nut is secured to the panel by the method described above. The panel edge is first deformed or folded over the inclined outer wall 220 of the groove and then extruded into the groove opening by annular projection 232 of the punch 230. It will be noted that the outer edge 234 includes an arcuate camming surface which provides the same function as the chamfer 34 of the tool 30 shown in FIG. 1.

The method of clinching the nut 210 to the panel 228 then includes disposing the nut against one face of the panel 228 with the groove 216 opening toward the panel and the nut bore 212 coaxially aligned with the panel opening 229. The punch 230 is then advanced against the opposed side of the panel with the projection 232 coaxially aligned with the panel opening. The panel edge surrounding the panel opening 229 is then deformed into the nut groove, over the inclined outer side wall 220. Finally, the annular projection 232 of the punch is advanced beyond the panel edge into the tool receiving recess defined by the arcuate groove wall 224 and the bottom wall 226 to deform the panel edge against the abutment wall 222 adjacent the outer wall and deform and compress the panel edge beneath the inclined outer groove wall 220 to securely retain the nut on the panel.

We claim:

1. A method of forming a nut and panel assembly, said nut having a panel supporting surface and a central bore generally perpendicular to said nut surface, said surface having an annular groove defined therein surrounding said bore, said groove having an outer wall inclined inwardly from the bottom wall of said groove and said groove bottom wall spaced farther from the plane of said surface adjacent said bore then at said inclined outer wall to define an annular tool receiving recess adjacent said bore, including the steps of:
   a. disposing said nut surface aginst one face of the panel,
   b. advancing a punch against the opposed side of said panel, said punch having an annular end portion conforming to said nut groove tool receiving recess and said panel having an aperture generally aligned with said nut bore,
   c. further advancing said punch, into said nut groove, to deform the edge of said panel aperture into said nut groove, over said inclined outer groove wall, and
   d. continuing to advance said punch into said nut groove, beyond said panel edge and into said tool receiving recess, to (1) deform said panel edge against said bottom groove wall, adjacent said outer wall, and (2) deform and compress said panel edge beneath said inclined outer groove wall to securely retain said nut on said panel.

2. The method defined in claim 1, including the step of punching a hole in said panel prior to disposing said nut against said panel and aligning said nut bore in substantial registry with said panel hole prior to deforming said panel edge.

3. A method of securing a nut to a panel, said nut having a bore and a channel on opposed sides of said bore, said channel having an outer side wall inclined inwardly, generally toward the axis of said bore from the bottom wall of said channel and said channel having a greater depth adjacent said nut bore than at said outer side wall, comprising the steps of:

a. punching a hole in said panel, b. disposing said nut against one face of said panel with the nut bore substantially aligned with said panel hole and said channel opening toward said panel, c. displacing the edge of said panel adjacent the hole into said nut channel by engaging the panel with the end portion of a tool generally conforming to the bottom wall of the channel adjacent said nut bore, d. advancing said tool end portion into said nut channel to deform said panel edge against said channel bottom wall, over said channel outer side wall, and e. continuing to advance said tool end portion into said nut channel beyond said panel edge and against said bottom wall adjacent said nut bore to deform said panel edge against said outer groove wall and securely retain said nut on said panel.

4. The method of securing a nut panel defined in claim 3, characterized in that said tool end portion includes an inclined outer edge, and said nut channel includes a distinct tool receiving recess having an inclined outer wall, including deforming said panel edge, beneath said outer side wall, with said inclined tool edge.

* * * * *